UNITED STATES PATENT OFFICE.

FRED B. LIVINGSTON, OF CAMBRIDGE, NEW YORK.

PROCESS OF BURNING LIME.

SPECIFICATION forming part of Letters Patent No. 241,034, dated May 3, 1881.

Application filed October 7, 1880. (Specimens.)

*To all whom it may concern:*

Be it known that I, FRED BASSETT LIVINGSTON, of the town of Cambridge, county of Washington, and State of New York, have invented a new and useful Improvement in Processes for Burning Lime, of which the following is a specification.

My invention relates to a process for burning lime from that native form of carbonate of lime known as "marble;" and the object of my invention is to produce a good quality of caustic lime from such marble as is quarried near the surface, and which is too soft for the ordinary uses to which marble is applied, as well as to utilize for this purpose the marble chips and fragments which are produced in quarrying and working marble.

It is well known that when this crystallized form of carbonate of lime is burned in the ordinary manner it deflagrates and crumbles under the action of the heat, and the resulting powder, though highly caustic, soon deteriorates. To remedy this condition I add to the marble at intervals, while being fed into the kiln, silicious sand, which is thrown in among the broken marble being burned. As the marble descends in the kiln the added sand works down through the interstices of the mass, and when reaching the bottom, where the heat is most intense, it fuses with the lime to form a silicate of the latter, which coats over the exterior surface of the fragments being burned, and so as to prevent their breaking up and crumbling. This coating of the silicate does not interfere with the elimination of the carbonic-acid gas during the operation of burning. Neither does it prevent the subsequent slaking of the lime in water. While it prevents the breaking up of the lime when being transported, it also prevents to a large extent the deterioration produced by becoming air-slaked. When lime thus produced is slaked in water the silicate becomes a solvent menstruum for further cementing the material with which it is usually associated for making mason's putty or mortar.

While my invention is more particularly intended to apply to that form of carbonate known as "marble," it may also be applied with the same beneficial results in the burning of such other kinds of the native carbonate of lime as crumble in the same manner in the kiln under the influence of heat.

Having thus described my invention, what I claim, and desire to secure by Letters Patent, is—

The process herein described for burning lime from a crystalline carbonate of lime which crumbles in the kiln when being heated, and consisting of the addition, in sufficient quantity, of silicious sand to coat the exterior surface of the fragments with a silicate of lime, which is formed by the sand and lime under the influence of the heat in the kiln while the lime is being burned.

Signed at Cambridge, New York, this 11th day of September, A. D. 1880.

FRED BASSETT LIVINGSTON.

Witnesses:
 GEO. H. BAKER,
 CLARK RICE.